3,223,669
PIGMENT PAD-DYEING COMPOSITIONS AND
TEXTILES DECORATED THEREWITH
Vernon L. Chase, Butler, and Ernest Messmer, Fair Lawn,
N.J., assignors to Interchemical Corporation, New
York, N.Y., a corporation of Ohio
No Drawing. Filed Nov. 13, 1962, Ser. No. 237,362
10 Claims. (Cl. 260—29.4)

This invention relates to pigment pad-dyeing reactive compositions for textiles and to textiles decorated therewith.

It has been found that, by using certain reactive aqueous pigment dispersions and reactive binder compositions, pad dyeings can be made that are superior to those of the prior art in the following respects. The overall fastness is excellent at greater depth of shade than in previously known systems, due to the binder combination and cross-linking mechanism. The "runnability" is excellent; there is no pad-roll buildup in long runs, the hydrophilic material balance imparting rewettability until the curing stage has started. The migration control is excellent, due to the combination of salts and alginate. Such control is not feasible when only alginate or the like is used alone. The separate packages display long-term stability. The color yield is excellent and the hand is good.

This invention provides pigment pad-dyeing compositions consisting of coloring matter dispersed in a vehicle comprising a reactive latex and reactive dispersant, a reactive binder, a highly reactive carboxyl-containing polyelectrolyte, and a crosslinking substance such as a polyfunctional imine or a water-soluble methylol melamine ether. This is compounded by combining the color concentrate containing reactive latex and reactive dispersant with the binder composition containing the same dispersant and latex plus the highly reactive carboxyl-containing polyelectrolyte and the crosslinker.

The art has already made use of a slightly reactive acrylic latex in combination with an organic solvent soluble melamine-formaldehyde reaction product, which shows little or no evidence of interaction with reactive groups on the latex polymer. Since the resin must be emulsified, large amounts of protective colloid are needed for stabilization, but such quantities impart a stiff hand to the finished fabric. Even when these colloids are used, the mechanical stability of the padding bath is limited. Migration control with such systems has never been classed as excellent; it is noticeably poorer on blends such as Dacron-cotton and it is also poorer at pigment levels in the bath of ¼% or higher.

Examination of commercially available latices in searching for a suitable reactive binder showed that they all lacked one or more of the following desirable properties; soft hand, alternate light-wash stability, reasonable crock resistance, mechanical stability, good rewettability, presence of reactive groups, and compatibility with the system. It was eventually found, however, that a latex could be made having all these properties. It consists of an aqueous dispersion of a copolymer of 70–90 parts of 2-ethylhexyl acrylate, 13–20 parts of acrylonitrile, and 2 parts of itaconic acid, the solids content being about 40% by weight. The itaconic acid gives better emulsion stability than other alpha-olefinic monobasic acids, such as methacrylic, acrylic, crotonic, etc. A minimum of 13% of acrylonitrile, based on the weight of total monomer, is desirable to avoid objectionable tackiness, while more than 20% imparts undesirable boardiness or stiffness of hand. The 2-ethylhexyl acrylate is better than butyl acrylate for flexibility with low tack. This latex is herein referred to as "Latex A." The combination of itaconic acid, acrylonitrile, and 2-ethylhexyl acrylate is good for crock resistance. As a polyfunctional imine, preference is given to the compound having the formula

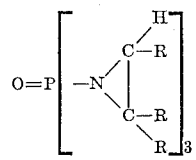

where R is H, CH$_3$, or C$_2$H$_5$.

In the examples parts are parts by weight.

EXAMPLE 1

| Color concentrate: | Parts |
|---|---|
| Phthalocyanine blue pigment | 0.40 |
| Sodium lauryl sulfate | 0.20 |
| Binder and pigment dispersant | 0.60 |
| Latex A | 0.36 |
| Crosslinker | 1.50 |
| Water | 23.00 |
| Resin binder emulsion: | |
| Latex A | 0.75 |
| Polyacrylic acid | 0.22 |
| Binder and pigment dispersant | 0.24 |
| Sodium lauryl sulfate | 0.10 |
| Water | 3.70 |
| 2% sodium alginate solution | 2.50 |
| 25% ammonium acetate | 4.00 |
| 28% ammonium hydroxide sufficient to adjust the pH to 8–9. | |
| Water to make 100.0. | |

A fabric was padded in a conventional way and after being can dried was heated at 250° F. for about 2 minutes when crosslinker C–1 was used. Crosslinker C–2 is preferably cured about 3 minutes at about 300° F.

EXAMPLE 2

| A. Color concentrates: | Parts |
|---|---|
| Phthalocyanine blue | 10.0 |
| Binder and pigment dispersant | 3.6 |
| "Duponol ME" | 6.0 |
| Latex A | 9.0 |
| NH$_4$OH (26%) to make the pH 7–8. | |
| Water to make 100.0. | |
| B. Clear extender: | |
| "Acrysol ASE-60" | 4.0 |
| Binder and pigment dispersant | 4.0 |
| Latex A | 13.3 |
| NH$_4$OH (26%) | 1.2 |
| "Duponol ME" | 1.6 |
| Water to make 100.0. | |
| Crosslinkers: | |
| (C–1) Tris-(2-methyl aziridinyl) phosphine oxide | 20 |
| Water to make 100. | |
| (C–2) Hexamethyl ether of hexamethylolmelamine | 60 |
| Isopropyl alcohol | 20 |
| Water to make 100. | |
| Migration controllers: | |
| (D–1) "Keltex" | 2.0 |
| Water to make 100. | |
| (D–2) Ammonium acetate | 25 |
| Water to make 100. | |
| Catalysts: | |
| (E–1) Diammonium phosphate | 35 |
| Water to make 100. | |
| (E–2) Ammonium nitrate | 50 |
| Water to make 100. | |
| (E–3) Sodium chloride | 20 |
| Water to make 100. | |

Combinations of the preceding constituents to make padding liquors having 1% pigment:

| | |
|---|---|
| (A) | 10.0 |
| (B) | 11.0 |
| (C-1) | [1] 2.5 to 7.5 |
| (D-1) | 2.5 to 5.0 |
| (D-2) | 4.0 |
| (E-1) | [2] 0.6 |
| Water to make 100. | |

[1] Or $C_2$, 0.8 to 2.5.
[2] Or E-2, 0.6 + E-3, 3.5.

*Binder and pigment dispersant*

125 parts of isopropanol were heated to reflux (82° C.). Then over a period of 1 hour was added a mixture of 28 parts acrylamide, 130 parts ethyl acrylate, 20 parts lauryl acrylate, 10 parts methacrylic acid, 75 pars isopropanol, 1.5 parts benzoyl peroxide, and 0.8 parts of tertiary-dodecyl mercaptan, the reflux temperature of 82–83° C. being maintained. Refluxing was continued 2 hours more. 1.5 parts of benzoyl peroxide were added. The batch was refluxed another hour, cooled, and the solvent vacuum distilled off at room temperature and 4.5 mm. of mercury. A solution of 64 parts of 37% formalin in 300 parts of water and 41 parts of 29% aqueous ammonium hydroxide was added to the resin and the mixture slowly brought up to 70° C. It was heated 4 hours more at 70–72° C. Solids content was 31%. Other proportions of monomer may also be used, for instance 60–70 parts of ethyl acrylate, 5–20 parts of lauryl methacrylate, 5–20 parts of methacrylic acid, and 10–20 parts of either acrylamide, N-methylolacrylamide, or N,N-diallyl melamine.

*Representative examples of prepartion of latex A*

240 g. of 2-ethylhexyl acrylate, 37 g. of acrylonitrile, 5.6 g. of itaconic acid, 29 g. of Triton X305, and 900 g. of water were stirred 15 to 20 minutes under a blanket of nitrogen and then 0.65 g. of ammonium persulfate and 0.75 g. of sodium metabisulfite were added. When the exotherm had leveled off at 38° to 40° C., there were added 270 g. of 2-ethylhexyl acrylate, 41 g. of acrylonitrile, 6.4 g. of itaconic acid, and 40 g. of Triton X305, the exotherm being allowed to continue. After the peak in the exotherm was reached, 0.85 g. of ammonium persulfate and 1.0 g. of sodium metabisulfite were added. There being no further rise in temperature the batch was cooled and filtered. The solids content was 39% by weight.

It was found that the commercial product, "Carboset 531" was also satisfactory as a binder and pigment dispersant. Migration control is substantially improved by adding a minor amount of a water-soluble, substantially neutral ammonium or alkali metal salt to modify the properties of the alginate. Appreciable improvement in wash fastness may be obtained through the use of a catalyst which is a minor amount of a water-soluble, substantially neutral, acid-generating, volatile or semi-volatile, ammonium or alkali metal salt. It is also convenient to use a suitable salt or mixture of salts to function both in migration control and in catalysis.

The polyacrylic acid used in the examples was a partially crosslinked polyacrylic acid of high molecular weight. Also suitable is "Acrysol ASE-60," which is a 28% by weight aqueous solution of a water-soluble carboxylic ternary copolymer of methyl methacrylate, ethyl acrylate, and acrylic acid, the acid content being 35% by weight based on the weight of the copolymer.

"Keltex" is sodium alginate.
"Duponol ME" is sodium lauryl sulfate.
"Triton X305" is a nonionic alkylaryl polyether alcohol that is the reaction product of tertiary-octyl phenol with ethylene oxide.

In the claims parts are parts by weight.

What is claimed is:

1. A pigment pad-dyeing reactive composition consisting of pigment dispersed in a vehicle comprising
   (a) about 2.0 parts of a reactive latex with a solids content of about 50 parts, the solid being an interpolymer of about 75–90 parts of 2-ethylhexyl acrylate, about 13–20 parts of acrylonitrile, and about 2 parts of itaconic acid,
   (b) about 0.25 parts of a reactive dispersant comprising a methylolated interpolymer of 60–70 parts of ethyl acrylate, 5–20 parts of lauryl acrylate, 5–20 parts of methacrylic acid, and 10–20 parts of acrylamide,
   (c) about 0.45 part of a 28% by weight aqueous solution of a water-soluble carboxylic ternary copolymer of methyl methacrylate, ethyl acrylate, and acrylic acid, the acid content being about 35% by weight based on the weight of the copolymer,
   (d) about 0.5 to 1.50 parts of a crosslinking agent selected from the group consisting of the hexamethyl ether of hexamethylol melamine and a polyfunctional imine having the formula

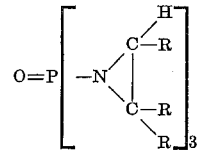

where R is selected from the group consisting of H, $CH_3$, and $C_2H_5$, and
   (e) water to make 100 parts.

2. The pigment pad-dyeing reactive composition of claim 1 in which (a) is a reactive latex with a solids content of about 50 parts, the solid being an interpolymer of 85 parts of 2-ethylhexyl acrylate, 13 parts of acrylonitrile, and 2 parts of itaconic acid.

3. The pigment pad-dyeing reactive composition of claim 1 in which (b) is a reactive dispersant comprising a methylolated interpolymer of about 69 parts ethyl acrylate, 11 parts lauryl acrylate, 5 parts methacrylic acid, and 15 parts acrylamide.

4. The pigment pad-dyeing reactive composition of claim 1 further characterized by the presence of about .05 to about 0.1 part of sodium alginate and about 1 part of ammonium acetate, the composition having been adjusted to a pH of 8–9 by the addition of ammonia.

5. The pigment pad-dyeing reactive composition of claim 1 further characterized by the presence of minor amounts of sodium alginate and at least one water-soluble substantially neutral salt selected from the group consisting of salts of ammonium and salts of alkali metals.

6. A textile web having a coating thereon of the cured composition of claim 1.

7. A textile web having a coating thereon of the cured composition of claim 2.

8. A textile web having a coating thereon of the cured composition of claim 3.

9. A textile web having a coating thereon of the cured composition of claim 4.

10. A textile web having a coating thereon of the cured composition of claim 5.

References Cited by the Examiner

UNITED STATES PATENTS

| | | | |
|---|---|---|---|
| 3,107,227 | 10/1963 | Suen et al. | 260—29.4 |
| 3,113,038 | 12/1963 | Lattarulo et al. | 260—29.6 |

MURRAY TILLMAN, *Primary Examiner.*